(12) United States Patent
Lickfelt et al.

(10) Patent No.: US 9,862,339 B1
(45) Date of Patent: Jan. 9, 2018

(54) SMART ENTRY DRIVER ID CHANGING

(71) Applicant: HONDA MOTOR CO., LTD., Minato-ku, Tokyo (JP)

(72) Inventors: Brian K Lickfelt, Raymond, OH (US); Kentaro Yoshimura, Raymond, OH (US); Chyuan Y Muh, Powell, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/192,446

(22) Filed: Jun. 24, 2016

(51) Int. Cl.
*B60R 16/037* (2006.01)
*B60R 25/24* (2013.01)

(52) U.S. Cl.
CPC .......... *B60R 16/037* (2013.01); *B60R 25/245* (2013.01)

(58) Field of Classification Search
CPC ............................. B60R 16/037; B60R 25/245
USPC .............................................................. 701/2
See application file for complete search history.

(56) References Cited

U.S. PATENT DOCUMENTS

| | | | |
|---|---|---|---|
| 8,626,357 B1 | 1/2014 | Lickfelt | |
| 9,102,299 B2 | 8/2015 | Creguer et al. | |
| 9,466,161 B2 * | 10/2016 | Ricci | G06Q 30/012 |
| 9,672,823 B2 * | 6/2017 | Penilla | G10L 15/22 |
| 2006/0164208 A1 * | 7/2006 | Schaffzin | G07C 9/00182 340/5.64 |
| 2010/0305779 A1 * | 12/2010 | Hassan | G01C 17/38 701/2 |
| 2014/0152422 A1 * | 6/2014 | Breed | G06K 9/00369 340/5.52 |
| 2014/0309806 A1 * | 10/2014 | Ricci | B60Q 1/00 701/1 |
| 2014/0309862 A1 * | 10/2014 | Ricci | G01C 21/00 701/36 |
| 2015/0149042 A1 * | 5/2015 | Cooper | B60R 16/037 701/48 |
| 2016/0318475 A1 * | 11/2016 | Honkanen | G07C 9/00182 |
| 2017/0140757 A1 * | 5/2017 | Penilla | G10L 15/22 |
| 2017/0200449 A1 * | 7/2017 | Penilla | G10L 15/22 |

* cited by examiner

*Primary Examiner* — Atul Trivedi
(74) *Attorney, Agent, or Firm* — Arent Fox LLP (57) ABSTRACT

A system and method for applying driver preference settings for a vehicle. A electronic control unit (ECU) of the vehicle determines whether a touch sensor disposed on a driver door handle of the vehicle is triggered. Upon determining that the touch sensor is triggered, the ECU transmits an exterior search signal from at least one antenna associated with the driver door. The ECU further determines whether a valid response signal was received from a fob in response to the transmitted exterior search signal, the valid response signal include an identification code unique to the fob (e.g., the driver). The ECU can assign a driver preference settings based on the identification code received in the valid response signal.

18 Claims, 6 Drawing Sheets

SMART ENTRY DRIVER ID CHANGING

TECHNICAL FIELD

This disclosure relates generally to a wireless passive entry system for a motor vehicle and, more particularly, to a method for changing driver identification for a passive entry vehicle.

BACKGROUND

In today's cars it has become standard to have a specific key fob for each driver of the vehicle. In the vehicle, each fob is "tied" to numerous potential functions and driver preference settings (e.g., radio presets, driver positioning, mirror positioning, and the like). In known passive entry systems, the driver preference settings are usually applied based on a fob identification found in a signal from the fob which allows entry into the vehicle. However, the driver may leave the doors of the vehicle unlocked when, for example, the vehicle is in a garage of his or her home. With current passive entry systems, the driver preference settings would not be changed if the driver accessed the vehicle without using his or her key fob. Rather, the driver identification would default to the previous values set at the last opening of the driver's door handle with a valid key fob. This can create confusion and frustration for the driver of the vehicle.

For example, a husband and wife may own and share a vehicle equipped with a passive entry system. The wife may access the vehicle using her key fob and then leave the vehicle unlocked in the garage. If the husband then enters the vehicle, the identification for the husband can be confused because the vehicle only recalls the identification of the wife, who was the last driver to open the front door handle carrying a valid key fob. Because the doors of the vehicle were unlocked, there was no fob identification present at the driver's door handle when the husband entered the vehicle. As such, even though the wife is not operating the vehicle, the driver preference settings are set for the wife and not the husband.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

According to one aspect, the present disclosure provides for a method of applying driver preference settings for a vehicle. The method can include determining whether a touch sensor disposed on a door handle of a driver door of the vehicle is triggered. The method can further include transmitting an exterior search signal from at least one antenna associated with the driver door upon determining that the touch sensor is triggered. In addition, the method can include determining whether a valid response signal was received from a fob in response to the transmitted exterior search signal, where the valid response signal can include an identification (ID) code unique to the fob. Furthermore, the method can include assigning a driver preference setting based on the ID code.

In accordance with another aspect, the present disclosure provides a vehicle system for setting driver preference settings for a vehicle. The vehicle system can include a touch sensor disposed on a door handle of the driver door for determining whether a driver of the vehicle touched the door handle, at least one antenna associated with the driver door, at least two fobs configured to wirelessly communicate with the at least one antenna, a memory for storing instructions, and a control unit communicatively coupled to the memory and the at least one antenna. The control unit can be configured to execute the instructions to determine whether the touch sensor is triggered, to transmit an exterior search signal from the at least one antenna associated with the driver door upon determining that the touch sensor is triggered, to determine whether a valid response signal was received from one of the at least two fobs in response to the transmitted exterior search signal, where the valid response signal includes an ID code unique to the fob, and to assign a driver preference setting based on the ID code.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

The novel features believed to be characteristic of aspects of the disclosure are set forth in the appended claims. In the descriptions that follow, like parts are marked throughout the specification and drawings with the same numerals, respectively. The drawing figures are not necessarily drawn to scale, and certain figures can be shown in exaggerated or generalized form in the interest of clarity and conciseness. The disclosure itself, however, as well as a preferred mode of use, further features and advances thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that can be used for implementation. The examples are not intended to be limiting.

A "bus," as used herein, refers to an interconnected architecture that is operatively connected to other computer components inside a computer or between computers. The bus is able to transfer data among the computer components. The bus can be a memory bus, a memory controller, a peripheral bus, an external bus, a crossbar switch, and/or a local bus, among others. The bus can also be a vehicle bus that interconnects components inside a vehicle using protocols, such as Controller Area network (CAN), Local Interconnect Network (LIN), among others.

A "memory," as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

An "operable connection," or a connection by which entities are "operatively connected," is one in which signals, physical communications, and/or logical communications can be sent and/or received. An operable connection can include a wireless interface, a physical interface, a data interface, and/or an electrical interface.

A "processor," as used herein, processes signals and performs general computing and arithmetic functions. Signals processed by the processor can include digital signals, data signals, computer instructions, processor instructions, messages, a bit, a bit stream, or other features that can be received, transmitted and/or detected. Generally, the processor can include a variety of various processors, including multiple single and multi-core processors and co-processors and other multiple single and multi-core processor and co-processor architectures. The processor can include various modules to execute various functions.

A "vehicle," as used herein, refers to any moving vehicle that is capable of carrying one or more human occupants and is powered by any form of energy. The term "vehicle" includes, but is not limited to: cars, trucks, vans, minivans, sport utility vehicles (SUVs), motorcycles, scooters, boats, personal watercraft, and aircraft. In some cases, a motor vehicle includes one or more engines. Further, the term "vehicle" can refer to an electric vehicle (EV) that is capable of carrying one or more human occupants and is operated entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. Further, the term "vehicle" can include vehicles that are automated or non-automated with pre-determined paths, or free-moving vehicles.

Figure 1:
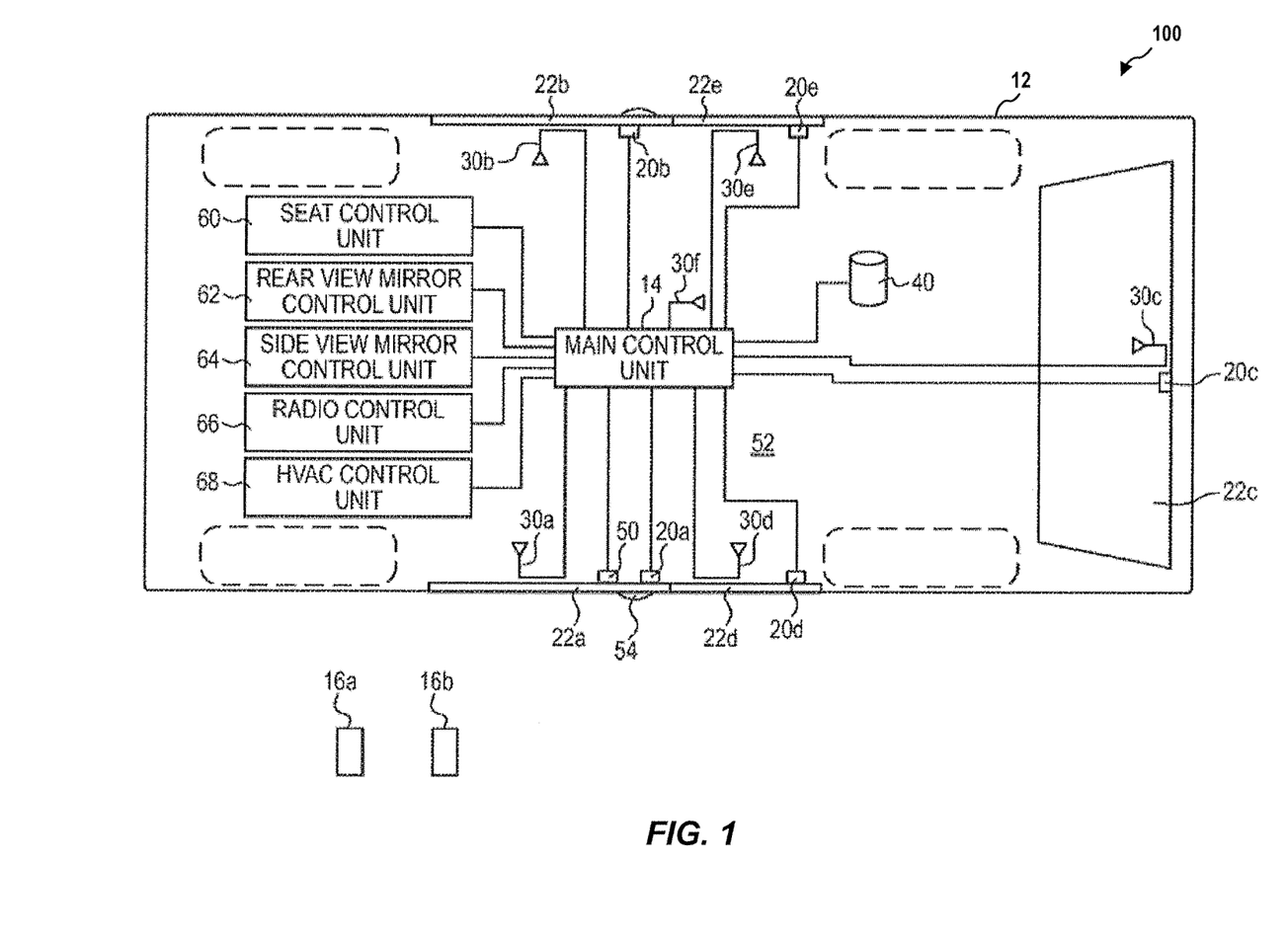
FIG. 1 illustrates a schematic depiction of an example vehicle system for setting driver preferences for a vehicle, in accordance with aspects of the present disclosure.

Generally described, the present disclosure provides for setting driver preference settings for a vehicle. Turning to FIG. 1, a schematic depiction of an example vehicle system 100 for setting driver preference settings for a vehicle 12 according to an aspect of the disclosure is provided. The components of the vehicle system 100, as well as the components of other systems, hardware architectures, and software architectures discussed herein, can be combined, omitted, or organized into different architectures for various aspects.

The vehicle system 100 can include a main control unit 14, which can include hardware and/or software capable of performing operations that will be described in more detail below. The vehicle system 100 can further include a plurality of fobs 16a, 16b. The fobs 16a, 16b can be configured to wirelessly communicate with the main control unit 14. The vehicle system 100 is capable of determining driver preference settings in a manner such that the appropriate driver preference setting can be set for the driver of the vehicle 12. The vehicle system 100 can be part of a passive entry system where the operator of the vehicle 12 need not perform any active function, e.g., press a button on the fobs 16a, 16b, to gain access to the vehicle.

The main control unit 14 can be operatively connected to a plurality of closure lock controllers, such as a driver's door lock controller 20a, a passenger's door lock controller 20b and a tailgate lock controller 20c. Each lock controller controls a respective lock for a respective closure. For example, the driver's door lock controller 20a controls a driver's door lock (not shown) for a driver door 22a, the passenger's door lock controller 20b controls a passenger's door lock (not shown) for a passenger's door 22b and the tailgate lock controller 20c controls a tailgate lock (not shown) for the tailgate 22c of the vehicle. The passenger's door 22b depicted in FIG. 1 is shown on an opposite side of the vehicle 12 as the driver's door 22a. The vehicle 12 can also include a first rear passenger's door 22d rearward from the driver door 22a on the same side of the vehicle as the driver's door 22a and a second rear passenger's door 22e rearward from the passenger's door 22b on the opposite side of the vehicle as the driver's door 22a. Door locks (not shown) and door lock controllers 20d, 20e, which can also be in communication with the main control unit 14, can also be associated with these other passenger's doors 22d and 22e, respectively. Each lock controller 20a, 20b, 20c, 20d and 20e, which can also be referred to as a closure lock controller, operates in a locked state, which places the respective closure lock in a locked position, and an unlocked state, which places the respective closure lock in an unlocked position.

The main control unit 14 can be operatively connected to a door unlocking sensor (not shown). The door unlocking sensor can be disposed on a surface (e.g., an inner and/or outer surface) of the outer door handle of the driver door 22a. The door unlocking sensor can include a switch utilizing an electrostatic capacitive touch sensor. The door unlocking sensor is normally placed in an off-state. When the driver grips the outer door handle, and more particularly when the driver touches the door unlocking sensor, the door unlocking sensor is turned on, and outputs a trigger signal having a predetermined pulse level to the main control unit 14.

The vehicle system 100 can also include a plurality of antennas 30a-30g. The main control unit 14 can be in communication with each antenna 30a-30f. The plurality of antennas 30a-30f includes a driver's door antenna 30a, which can be located on or adjacent to the driver door 22a of the vehicle 12. The plurality of antennas can further include a passenger's door antenna 30b located on or adjacent the passenger's door 22b, which is located on an opposite side of the vehicle as the driver's door and can typically be referred to as a front passenger's door. The plurality of antennas can also include a tailgate antenna 30c located on or adjacent to the tailgate 22c of the vehicle 12. The plurality of antennas can also include rear passenger door antennas 30d and 30e located on or near respective rear passenger doors 22d and 22e of the vehicle. The antennas 30a-30f that are associated with a respective closure are configured to transmit an exterior search signal to locate fobs near the respective closure and outside of the vehicle. The vehicle system 100 can further include an antenna 30f, which is configured to transmit an interior search signal to locate fobs within the vehicle. Although only one antenna 30f for transmitting an interior search signal is shown, multiple interior search antennas can be provided.

The plurality of antennas can also include a receiving antenna 30g in communication with the main control unit 14. The receiving antenna 30g can be configured to receive response signals transmitted from the fobs 16a, 16b. The response signals can be transmitted from the fobs 16a, 16b in response to receiving a search signal, which is transmitted from the antennas 30a-30g. The response signals can include an access code for changing the state of the lock controllers 20a-20e and an ID code unique to the fob that transmitted the response signal. The response signals can be transmissions such as, but not limited to, radio frequency (RF) transmissions or low frequency (LF) transmissions.

The main control unit 14 can include an internal processor (not shown), an internal processing memory (not shown), an interface circuit (not shown), and bus lines for transferring data, sending commands, and communicating with the vehicle system 100. The vehicle system can further include a memory 40, which can be operatively connected to the main control unit 14. The vehicle 12 can also include a bus for sending data internally among the various components of the vehicle system 100.

Figure 2:
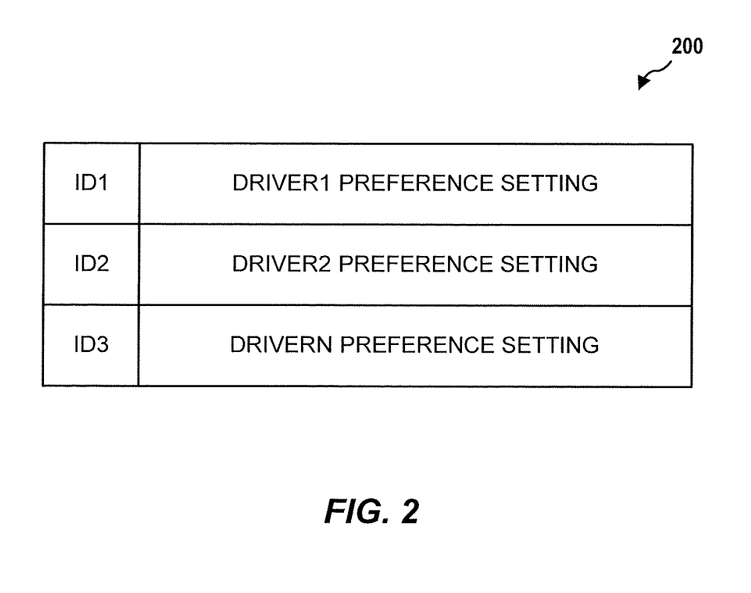
FIG. 2 illustrates a schematic depiction of a table stored in a memory of the example vehicle system depicted in FIG. 1.

FIG. 2 depicts a table 42, which can be stored in the memory 40 (FIG. 1). The memory 40 (FIG. 1) can store at least two driver preference settings, e.g., Driver1 Preference Setting, Driver2 Preference Setting, and DriverN Preference Setting, each associated with a different driver of the vehicle 12 (FIG. 1). The driver preference settings and identifications shown in FIG. 2 can be stored in other manners that allow each different driver of the vehicle 12 (FIG. 1) to be associated with a respective driver preference setting.

Referring again to FIG. 1, each driver of the vehicle 12 typically carries his or her own fob 16a, 16b. Only fobs 16a, 16b are shown in FIG. 1; however, a greater number of fobs can be employed in the vehicle system 100. If more than two fobs are provided, further identifications can be provided, which is denoted as IDN in table 42 (FIG. 2). Each fob 16a, 16b can be associated with a unique identification. For example, a first fob 16a can be associated with ID1 and a second fob 16b can be associated with ID2 (see, e.g., table 42 in FIG. 2). The fobs 16a, 16b can be similar to known fobs capable of transmitting signals to and receiving wireless signals from the vehicle 12. Moreover, the fobs 16a, 16b can be other wireless communication devices such as a mobile phone and other devices capable of transmitting wireless signals to and receiving wireless signals from the vehicle 12. For example, the fobs 16a, 16b can be a communications device capable of providing wireless communications utilizing various protocols to send/receive electronic signals with respect to the vehicle 12. These protocols can include a wireless system utilizing radio frequency communications (e.g., IEEE 802.11 (Wi-Fi), IEEE 802.15.1 (Bluetooth®)), a near field communication system (NFC) (e.g., ISO 13157), a local area network (LAN), a wireless wide area network (WWAN) (e.g., cellular) and/or a point-to-point system.

The vehicle system 100 can further include a plurality of door switches 50a-50e, which can each be operatively connected to the main control unit 14. Each door switch 50a-50e can determine whether the respective door is open or closed. For example, the driver's door switch 50a can send a signal to the main control unit 14, which allows the main control unit to determine whether the driver's door 22a has changed from open to closed. Each of the remaining door switches 50b-50e can send similar signals to the main control unit 14 for detecting whether the respective closure is open or closed.

The main control unit 14 can be operatively connected to each closure lock controller 20a-20e, each antenna 30a-30g, the door switches 50a-50e. The main control unit 14 can be configured to initiate a search signal from at least one of the antennas 30a-30e to locate at least one of the at least two fobs 16a, 16b located outside of and adjacent to the vehicle 12. The main control unit 14 can also be configured to initiate a search signal from the antenna 30f to locate at least one of the at least two fobs 16a, 16b located inside the vehicle 12.

The main control unit 14 can also be configured to assign a driver preference setting based on an ID code in a response signal transmitted from one of the fobs 16a, 16b. The response signal from each fob 16a, 16b can include the ID code that is unique to the particular fob. The main control unit 14 can assign the Driven Preference Setting when the ID code ID1 has been received in a response signal transmitted from the first fob 16a. The main control unit 14 can assign the Driver2 Preference Setting when the ID code ID2 has been received in a response signal transmitted from the second fob 16b. For example, the main control unit 14 can assign the respective driver preference setting based on a response signal received from the driver's door antenna 30a.

The main control unit 14 can also be configured to update and apply the appropriate assigned driver preference setting. The driver preference setting can include at least one of a vehicle seat setting, a rear view mirror setting, a side view mirror setting, a radio station setting and an HVAC setting. FIG. 1 depicts the vehicle system 100 as including a seat control unit 60, a rear view mirror control unit 62, a side view mirror control unit 64, a radio control unit 66 and an HVAC control unit 68. Each control unit 60-68 is depicted as separate from and operatively connected to the main control unit 14. Each control unit 60-68, or at least one of the control units, could also be integrated into the main control unit 14. The seat control unit 60 can control the vehicle seat setting, e.g., by controlling movement of at least one of the seats (not shown) of the vehicle 12. The rear view mirror control unit 62 can control the rear view mirror setting, e.g., by controlling movement of the rear view mirror (not shown) of the vehicle 12. The side view mirror control unit 64 can control the side view mirror setting, e.g., by controlling movement of the side view mirror (not shown) of the vehicle 12. The radio control unit 66 can control the radio (not shown) of the vehicle, e.g., by controlling radio presets and the like. The HVAC control unit 68 can control the HVAC system (not shown) of the vehicle, e.g., by controlling HVAC presets and the like.

Figure 3A:
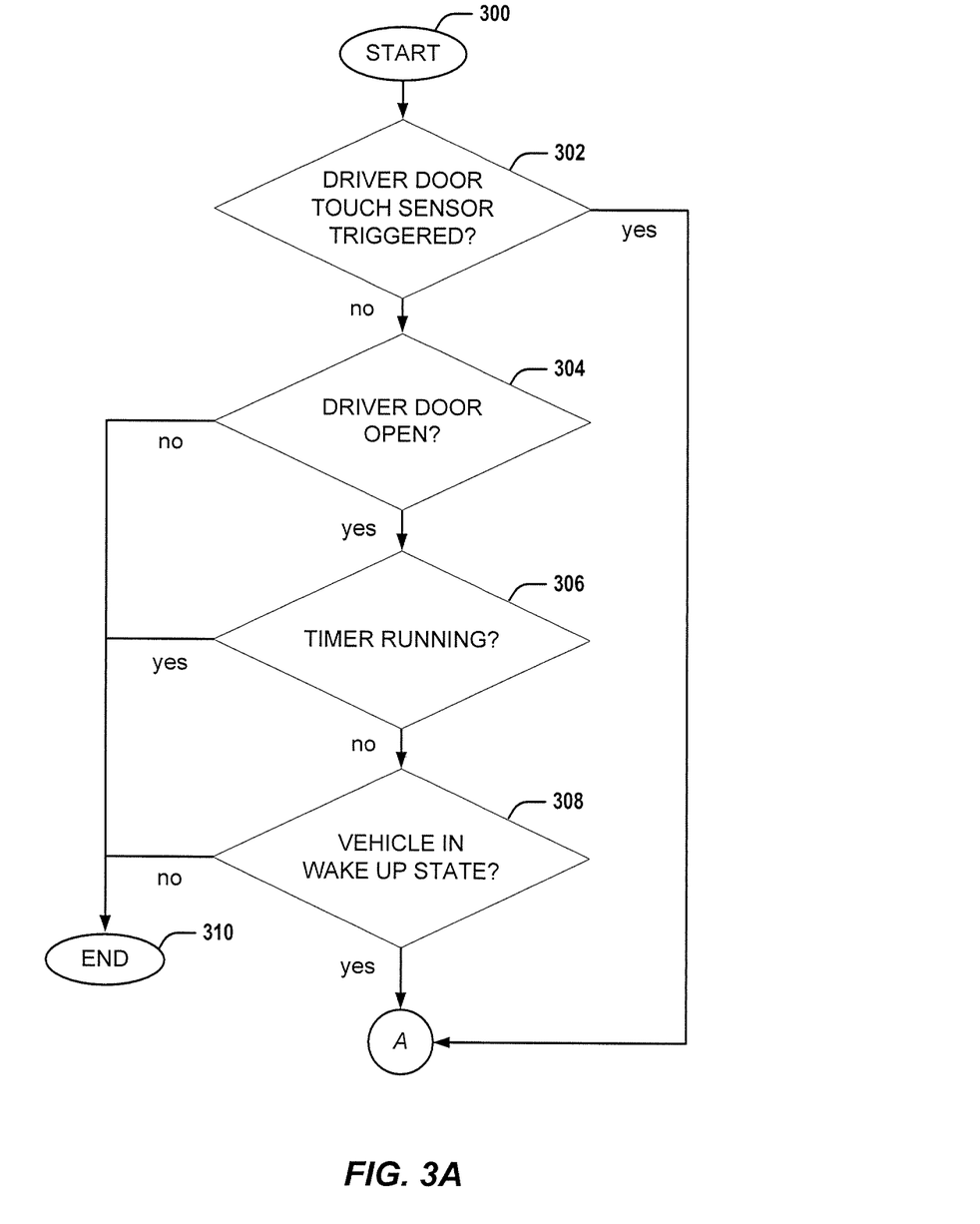
FIG. 3A and 3B illustrate an example process flow diagram of a method for applying driver settings for a vehicle, in accordance with aspects of the present disclosure.
Figure 3B:
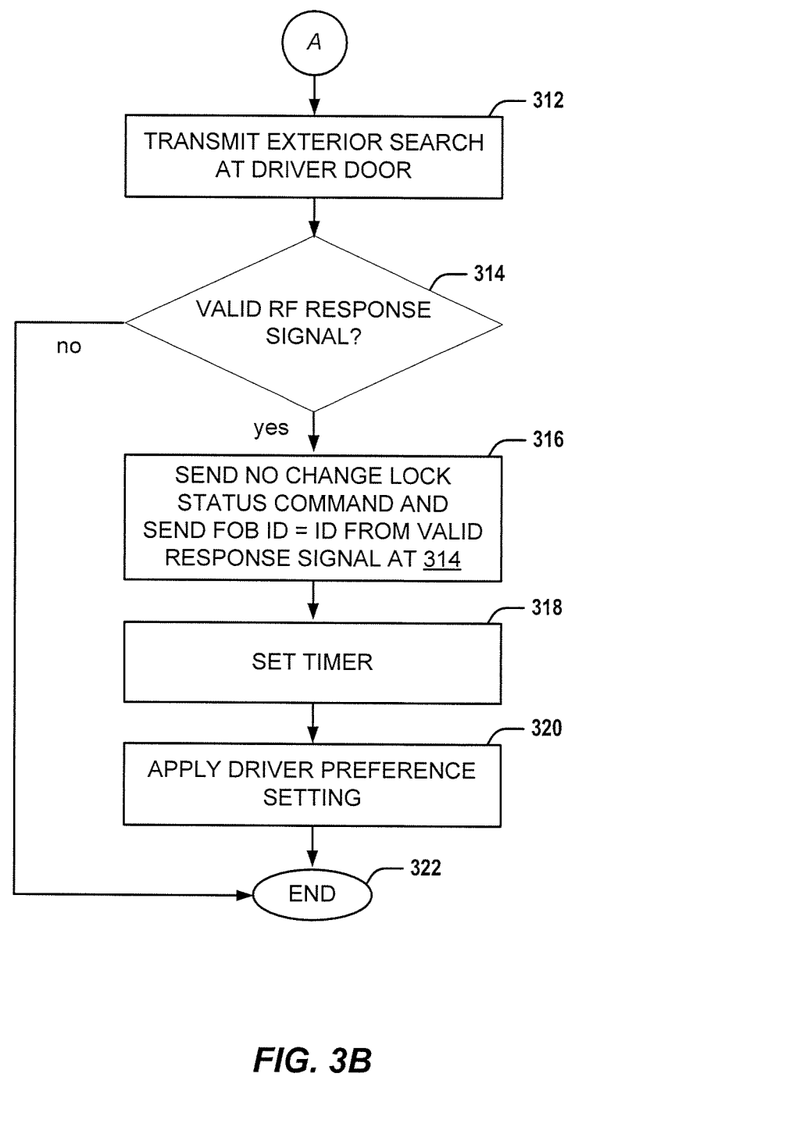

A method for applying driver preference settings for a vehicle will be described with reference to FIGS. 3A and 3B. Even though FIGS. 3A and 3B depict operations in a logical order, the order in which the operations are performed should not be limited to the order in which they are presented in FIGS. 3A and 3B or the order in which they are described below. For instance, the operations of FIGS. 3A and 3B can be implemented simultaneously by the main control unit 14. Additionally, the method for applying driver preference settings depicted in FIGS. 3A and 3B will be described with reference to the vehicle system 100 shown in FIG. 1; however, it is to be appreciated that the method can be used with other similar vehicle systems.

Referring now to FIGS. 3A and 3B, a method for applying driver preference settings according to an example aspect of the present disclosure will be discussed. FIGS. 3A and 3B will be described with reference to the components of FIG. 1 and FIG. 2. Additionally, the methods will be described with reference to algorithms, which can also be implemented with the system shown in FIG. 1 and described in conjunction therewith, and other systems and methods. With reference to FIG. 3A and 3B, the method for applying driver preference settings begins at 300. At 300, the driver door 22a is unlocked. The determination that the driver door is unlocked can be based on a state of the driver door lock controller 20a, which is operatively connected to the main control unit 14. Further, at 300, the driver preference settings for the previous driver of the vehicle 12 are applied by the main control unit 14.

At block 302, the method includes determining whether or not the door unlocking sensor (not shown) disposed on the driver door 22a is triggered. The main control unit 14 can determine whether the door unlocking sensor is triggered based on whether or not a trigger signal has been received from door unlocking sensor. For example, if the trigger signal has been received from the door unlocking sensor (e.g., the door unlocking sensor has been touched by the driver), then the main control unit 14 can determine the door unlocking sensor is triggered and can proceed to implement block 312. Otherwise, if the trigger signal has not been received from the door unlocking sensor (e.g., the door unlocking sensor has not been touched by the driver), then the main control unit 14 can determine that the door unlocking sensor has not been triggered and the main control unit 14 can proceed to implement block 304.

At block 304, the method includes determining whether the driver door 22a is open or closed. The main control unit 14 can determine whether the driver door 22a is open or closed based on the door switch 50a associated with driver door 22a. For example, the door switch 50a can continuously or periodically send a signal to the main control unit 14. The main control unit can determine whether the driver door 22a has changed from open to closed based on, e.g., a signal level of the signal received from the door switch 50a. If the main control unit 14 determines that the driver door 22a is closed, then the method ends at block 310. Otherwise, if the main control unit 14 determines that the driver door 22a is open, then the main control unit 14 can proceed to implement block 306.

At block 306, the method includes determining whether or not a timer has been set at block 316 and, if the timer has been set, whether or not a duration of the timer has elapsed. If the main control unit 14 determines that the duration of the timer has not elapsed (e.g., a valid fob ID has recently been identified), then the method ends at block 310. Otherwise, if the main control unit 14 determines that the duration of the timer has elapsed or the timer has not been set, then the main control unit 14 can proceed to implement block 308.

At block 308, the method includes determining whether or not the vehicle 12 is in a wake up state. The main control unit 14 can determine whether the vehicle is in the wake up state based on a status of the vehicle communication bus. For example, the main control unit 14 can determine whether the vehicle is in the wake up state based on a type or an amount of data and/or commands communicated between components of the vehicle system 100 on the bus. If the main control unit 14 determines that the vehicle is not in the wake up state (e.g., the HVAC system is on), then the method ends at block 310. Otherwise, if the main control unit 14 determines that the vehicle is in the wake up state, then the main control unit 14 can proceed to implement block 312.

At block 312, the method includes transmitting the exterior search signal at a door of the driver 22a of the vehicle 12. For example, the main control unit 14 can transmit the exterior search signal from antenna 30a associated with the door of the driver 22a.

At block 314, the method includes determining whether or not a valid RF response signal is received in response to the exterior search signal that was transmitted at block 312. If the main control unit 14 determines that no valid RF response signal is received, then the method ends at 322. Otherwise, if a valid RF response signal is received, then the main control unit 14 can proceed to implement block 316.

At block 316, the method includes sending a NO CHANGE LOCK STATUS command and recording the fob ID from the valid response signal received at block 314. For example, the main control unit 14 can send the NO CHANGE LOCK STATUS command to the closure lock controllers 20a-20e and record the fob ID received at block 314 in memory 40.

At block 318, the method includes setting a duration of a timer after recording the fob ID at block 316. The timer can be, for example, an internal timer of the main control unit 14. The main control unit 14 can set a duration of the timer to be, e.g., five seconds. It is to be appreciated that the duration of the timer can also be any value greater than or less than five seconds.

At block 320, the method includes applying the driver preference settings once the duration of the timer set at block 318 has elapsed. Once the duration of the timer has elapsed, the main control unit 14 can obtain the fob ID recorded at block 316 from memory 40 and apply the driver preference setting associated with that fob ID, and the method ends at 322.

Figure 4:
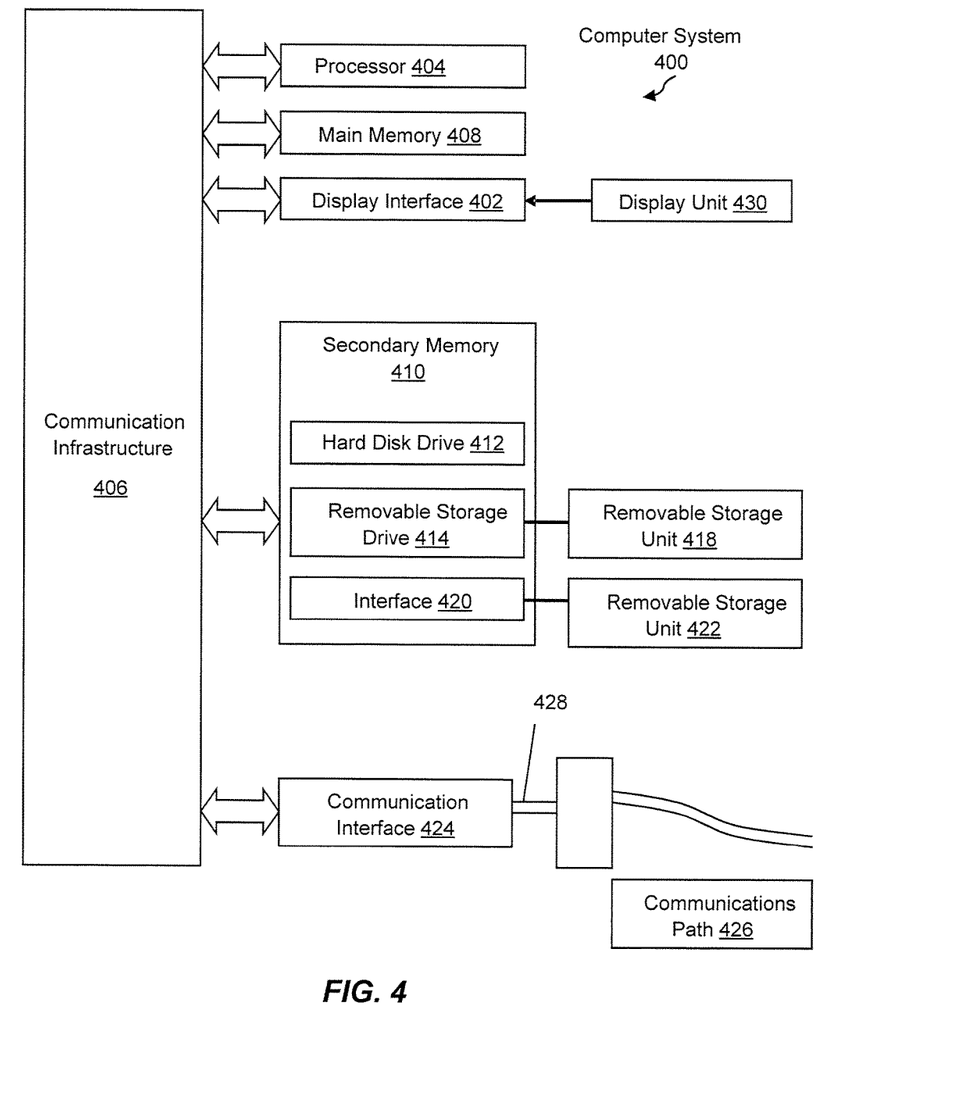
FIG. 4 illustrates an exemplary system diagram of various hardware components and other features for use in accordance with aspects of the present disclosure.

Aspects of the present disclosure can be implemented using hardware, software, or a combination thereof and can be implemented in one or more computer systems or other processing systems. In one aspect, the disclosure is directed toward one or more computer systems capable of carrying out the functionality described herein. FIG. 4 illustrates an example system diagram of various hardware components and other features that can be used in accordance with aspects of the present disclosure. Aspects of the present disclosure can be implemented using hardware, software, or a combination thereof and can be implemented in one or more computer systems or other processing systems. In one exemplary variation, aspects of the disclosure are directed toward one or more computer systems capable of carrying out the functionality described herein. An example of such a computer system 400 is shown in FIG. 4. The computer 400 can correspond to main control unit 14 illustrated in FIG. 1.

Computer system 400 includes one or more processors, such as processor 404. The processor 404 is connected to a communication infrastructure 406 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer system 400 can include a display interface 402 that forwards graphics, text, and other data from the communication infrastructure 406 (or from a frame buffer not shown) for display on a display unit 430. Computer system 400 also includes a main memory 408, preferably random access memory (RAM), and can also include a secondary memory 410. The secondary memory 410 can include, for example, a hard disk drive 412 and/or a removable storage drive 414, representing a floppy disk drive, a magnetic tape drive, an optical disk drive, etc. The removable storage drive 414 reads from and/or writes to a removable storage unit 418 in a well-known manner. Removable storage unit 418, represents a floppy disk, magnetic tape, optical disk, etc., which is read by and written to removable storage drive 414.

As will be appreciated, the removable storage unit 418 includes a computer usable storage medium having stored therein computer software and/or data.

In alternative aspects, secondary memory 410 can include other similar devices for allowing computer programs or other instructions to be loaded into computer system 400. Such devices can include, for example, a removable storage unit 422 and an interface 420. Examples of such can include a program cartridge and cartridge interface (such as that found in video game devices), a removable memory chip (such as an erasable programmable read only memory (EPROM), or programmable read only memory (PROM)) and associated socket, and other removable storage units 422 and interfaces 420, which allow software and data to be transferred from the removable storage unit 422 to computer system 400.

Computer system 400 can also include a communications interface 424. Communications interface 424 allows software and data to be transferred between computer system 400 and external devices. Examples of communications interface 424 can include a modem, a network interface (such as an Ethernet card), a communications port, a Personal Computer Memory Card International Association (PCMCIA) slot and card, etc. Software and data transferred via communications interface 424 are in the form of signals 428, which can be electronic, electromagnetic, optical or other signals capable of being received by communications interface 424. These signals 428 are provided to communications interface 424 via a communications path (e.g., channel) 426. This path 426 carries signals 428 and can be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 480, a hard disk installed in hard disk drive 470, and signals 428. These computer program products provide software to the computer system 400. Aspects of the disclosure are directed to such computer program products.

Computer programs (also referred to as computer control logic) are stored in main memory 408 and/or secondary memory 410. Computer programs can also be received via communications interface 424. Such computer programs, when executed, enable the computer system 400 to perform various features in accordance with aspects of the present disclosure, as discussed herein. In particular, the computer programs, when executed, enable the processor 404 to perform such features. Accordingly, such computer programs represent controllers of the computer system 400.

In variations where aspects of the disclosure are implemented using software, the software can be stored in a computer program product and loaded into computer system 400 using removable storage drive 414, hard drive 412, or communications interface 420. The control logic (software), when executed by the processor 404, causes the processor 404 to perform the functions in accordance with aspects of the disclosure as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects of the disclosure are implemented using a combination of both hardware and software.

Figure 5:
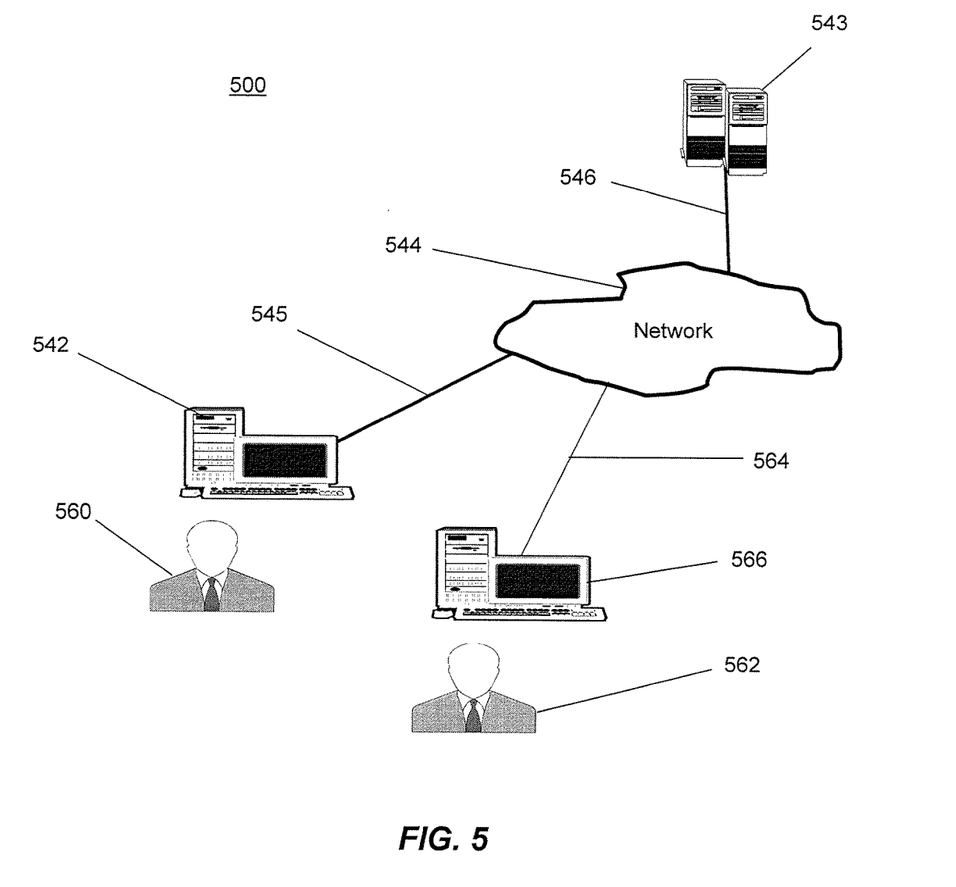
FIG. 5 illustrates a block diagram of various exemplary system components for use in accordance with aspects of the present disclosure.

FIG. 5 illustrates a block diagram of various example system components that may be used in accordance with aspects of the present disclosure. For example, the various components may be within the vehicle 12, or only some of the components may be within the vehicle 12, and other components may be remote from the vehicle 12. The system 500 includes one or more accessors 560, 562 (also referred to interchangeably herein as one or more "users") and one or more terminals 542, 566 (such terminals may be or include, for example, various features of the vehicle system 100). In one aspect, data for use in accordance with aspects of the present disclosure is, for example, input and/or accessed by accessors 560, 562 via terminals 542, 566, such as personal computers (PCs), minicomputers, mainframe computers, microcomputers, telephonic devices, or wireless devices, such as personal digital assistants ("PDAs") or a hand-held wireless devices coupled to a server 543, such as a PC, minicomputer, mainframe computer, microcomputer, or other device having a processor and a repository for data and/or connection to a repository for data, via, for example, a network 544, such as the Internet or an intranet, and couplings 545, 546, 564. The couplings 545, 546, 564 include, for example, wired, wireless, or fiber optic links. In another example variation, the method and system in accordance with aspects of the present disclosure operate in a stand-alone environment, such as on a single terminal.

The aspects of the disclosure discussed herein can also be described and implemented in the context of non-transitory computer-readable storage medium storing computer-executable instructions. Non-transitory computer-readable storage media includes computer storage media and communication media. For example, flash memory drives, digital versatile discs (DVDs), compact discs (CDs), floppy disks, and tape cassettes. Non-transitory computer-readable storage media can include volatile and nonvolatile, removable and non-removable media implemented in any method or technology for storage of information such as computer readable instructions, data structures, modules, or other data. Non-transitory computer readable storage media excludes transitory and propagated data signals.

It will be appreciated that various implementations of the above-disclosed and other features and functions, or alternatives or varieties thereof, can be desirably combined into many other different systems or applications. Also that various presently unforeseen or unanticipated alternatives, modifications, variations, or improvements therein can be subsequently made by those skilled in the art which are also intended to be encompassed by the following claims.

What is claimed is:

1. A method for applying preference settings for a vehicle, the method comprising:
   determining whether a sensor disposed on a driver door of the vehicle is triggered, the sensor being a touch sensor for controlling a lock of the driver door;
   upon determining that the sensor is triggered, transmitting an exterior search signal from at least one antenna associated with the driver door, wherein triggering the sensor causes the driver door to unlock;
   upon determining that the sensor is not triggered, determining whether the driver door is open or closed;
   determining whether a valid response signal was received from a fob in response to the transmitted exterior search signal, wherein the valid response signal includes an identification (ID) code unique to the fob; and
   assigning a driver preference setting based on the ID code.

2. The method of claim 1, further comprising:

upon determining that the valid response signal was received from the fob, setting a timer; and assigning the driver preference setting based on the ID code after waiting a duration of the timer.

3. The method of claim 1, further comprising:

upon determining that the driver door is open, determining whether a duration of a timer has elapsed.

4. The method of claim 3, further comprising:

upon determining that the duration of the timer has elapsed, determining whether the vehicle is in a waking up state; and upon determining that the duration of the timer has not elapsed, no change to the driver preference setting is applied.

5. The method of claim 4, further comprising:

upon determining that the vehicle is in the waking up state, transmitting the exterior search signal from the at least one antenna associated with the driver door; and upon determining that the vehicle is not in the waking up state, no change to the driver preference setting is applied.

6. The method of claim 1, further comprising:

upon determining that the driver door is closed, no change to the driver preference setting is applied.

7. A vehicle system for applying preference settings for a vehicle, the vehicle system comprising:

a sensor disposed on a driver door for determining whether a driver of the vehicle touched the door for entry into the vehicle;

at least one antenna associated with the driver door;

at least two fobs configured to wirelessly communicate with the at least one antenna;

a memory for storing instructions;

a control unit communicatively coupled to the memory and the at least one antenna, the control unit being configured to execute the instructions to:

determine whether the sensor is triggered, wherein triggering the sensor causes the driver door to unlock;

upon determining that the sensor is triggered, transmit an exterior search signal from the at least one antenna associated with the driver door;

upon determining that the sensor is not triggered, determine whether the driver door is open or closed based on a signal from a driver door switch communicatively coupled to the control unit;

determine whether a valid response signal was received from one of the at least two fobs in response to the transmitted exterior search signal, wherein the valid response signal includes an identification (ID) code unique to the fob; and assign a driver preference setting based on the ID code.

8. The vehicle system of claim 7, wherein the control unit is further configured to:

upon determining that the valid response signal was received from the fob, set a timer; and assign the driver preference setting based on the ID code after waiting a duration of the timer.

9. The vehicle system of claim 8, wherein the sensor is a touch sensor.

10. The vehicle system of claim 7, wherein the control unit is further configured to:

upon determining that the driver door is open, determine whether a duration of a timer has elapsed.

11. The vehicle system of claim 10, wherein the control unit is further configured to:

upon determining that the duration of the timer has elapsed, determine whether the vehicle is in a waking up state; and upon determining that the duration of the timer has not elapsed, apply no changes to the driver preference setting.

12. The vehicle system of claim 11, wherein the control unit is further configured to:

upon determining that the vehicle is in the waking up state, transmit the exterior search signal from the at least one antenna associated with the driver door;

upon determining that the vehicle is not in the waking up state, apply no change to the driver preference setting.

13. The vehicle system of claim 7, wherein the control unit is further configured to:

upon determining that the driver door is closed, apply no changes to the driver preference setting.

14. A non-transitory computer-readable medium, comprising:

code for determining whether a sensor disposed on a driver door of the vehicle is triggered, the sensor controlling a lock of the driver door;

code for, upon determining that the sensor is triggered, transmitting an exterior search signal from at least one antenna associated with the driver door, wherein triggering the sensor causes the driver door to unlock;

code for, upon determining that the sensor is not triggered, determining whether the driver door is open or closed;

code for determining whether a valid response signal was received from a fob in response to the transmitted exterior search signal, wherein the valid response signal includes an identification (ID) code unique to the fob; and code for assigning a driver preference setting based on the ID code.

15. The non-transitory computer-readable medium of claim 14, further comprising:

code for, upon determining that the valid response signal was received from the fob, setting a timer; and code for, assigning the driver preference setting based on the ID code after waiting a duration of the timer.

16. The non-transitory computer-readable medium of claim 14, further comprising:

code for, upon determining that the driver door is open, determining whether a duration of a timer has elapsed.

17. The non-transitory computer-readable medium of claim 16, further comprising:

code for, upon determining that the duration of the timer has elapsed, determining whether the vehicle is in a waking up state; and code for, upon determining that the duration of the timer has not elapsed, no change to the driver preference setting is applied.

18. The non-transitory computer-readable medium of claim 17, further comprising:

code for, upon determining that the vehicle is in the waking up state, transmitting the exterior search signal from the at least one antenna associated with the driver door; and code for, upon determining that the vehicle is not in the waking up state, no change to the driver preference setting is applied.

* * * * *